Oct. 20, 1959  B. UESSEM  2,908,975
DEVICE FOR MAKING DENTURES
Filed Sept. 14, 1954  4 Sheets-Sheet 2

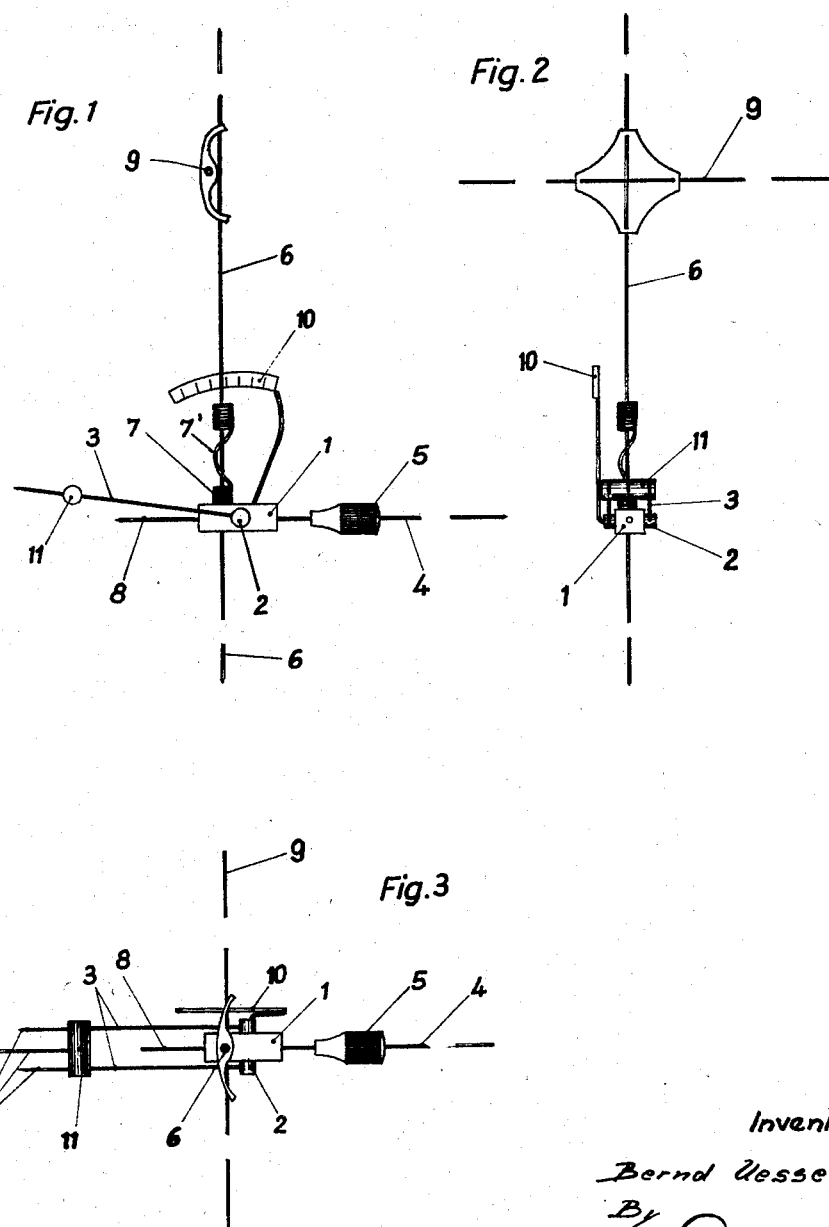

Inventor
Bernd Uessem
By
Patent Agent

Oct. 20, 1959     B. UESSEM     2,908,975
DEVICE FOR MAKING DENTURES
Filed Sept. 14, 1954     4 Sheets-Sheet 3
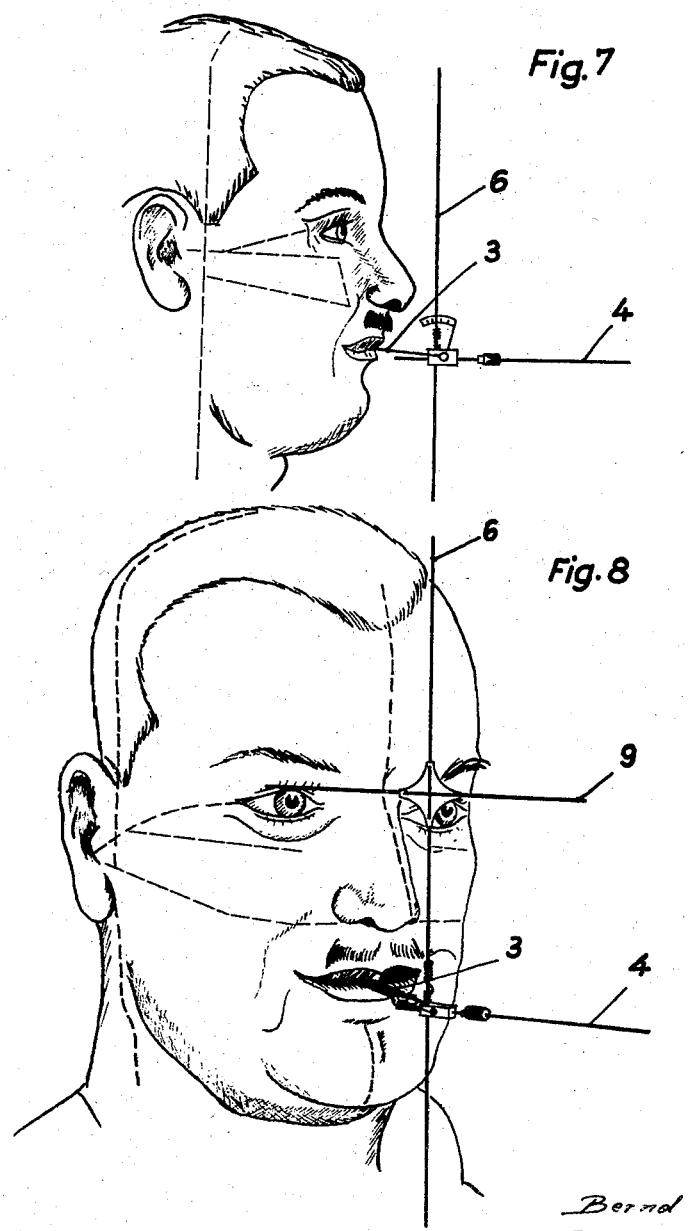

Oct. 20, 1959  B. UESSEM  2,908,975
DEVICE FOR MAKING DENTURES
Filed Sept. 14, 1954  4 Sheets-Sheet 4

Inventor
Bernd Uessem
By
Walter Juling
Patent Agent

United States Patent Office 2,908,975
Patented Oct. 20, 1959

2,908,975
DEVICE FOR MAKING DENTURES
Bernd Uessem, Boxberg, Baden, Germany
Application September 14, 1954, Serial No. 455,993
Claims priority, application Germany September 15, 1953
9 Claims. (Cl. 32—19)

The present invention relates to dentistry and, more particularly, concerns a method of and device for anatomically properly orienting the impressions taken for making dental plates, bridges and the like.

When making such dental plates and bridges, it is indispensable in order to obtain an anatomically satisfactory fit of the dental plate or bridgework, properly anatomically and spacially to orient the impression in the articulator. Heretofore this problem could not be properly solved because methods and devices for such proper orientation were not available. Therefore, it was necessary to effect the orienting of the jaw impressions and the like more or less according to the judgment and personal experience of the dentist. This, however, frequently led to the result that the dental plates or bridgework were not satisfactory from an anatomic standpoint and their fitting was faulty in spite of frequent fitting and readjusting.

Attempts have been made to obtain the proper position of the jaw impressions by marking the chewing plane on the wax wall of the dental plates by marks such as notches. The chewing plane is defined by the chewing surfaces of the upper and lower rows of teeth. This method, however, was so unsatisfactory that frequently the fixing of the chewing plane was abandoned, and the dentist carried out the orientation of the plates according to his own judgment.

It is, therefore, an object of the present invention to provide a method and device which will overcome the above mentioned drawbacks.

It is another object of this invention to provide a method which will make it possible to arrange the jaw impressions in a spacially precise position which corresponds to the respective anatomic conditions of the patient.

It is still another object of this invention to provide a device which will make it possible in a simple manner to carry out the method set forth in the preceding paragraph.

These and other objects and advantages of the invention will appear more clearly from the following specification in connection with the accompanying drawings in which:

Fig. 1 represents a diagrammatic illustration of a side view of a device for carrying out the method according to the present invention.

Fig. 2 is a front view of the device shown in Fig. 1.

Fig. 3 is a top view of the device illustrated in Fig. 1.

Figs. 7 and 8 illustrate a phase of the method according to the invention.

Figure 10:
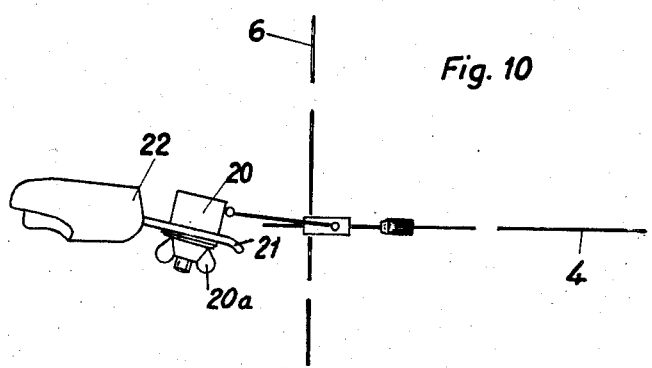

Fig. 10 diagrammatically illustrates the rod system according to the invention with the impression tray after removing the latter from the mouth of the patient.

Figure 11:
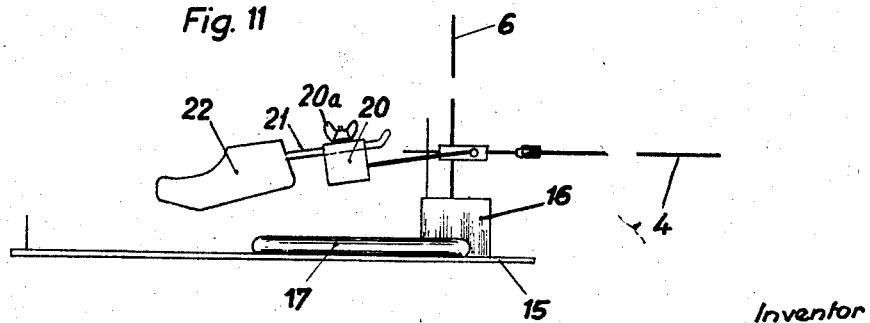

Fig. 11 illustrates the system of Fig. 10 with the top turned upside down.

*General arrangement*

According to the present invention, the proper orientation of the impressions in the articulator is effected by means of an arrangement which comprises rods that cross each other and at least two of which are arranged perpendicular to each other while one rod is tiltable and adjustable. The said rods are so adjusted on the patient that one rod will be located in the sagittal plane parallel to the chewing plane while one or a plurality of other rods are adjusted so that they will likewise be parallel to the sagittal plane and/or will be located perpendicular to the skull base plane also called the "Frankfort" or "eye-ear" plane. The thus adjusted arrangement serves for ascertaining in the articulator the position of the impressions. To this end, first the orientation of the entire system with regard to the chewing plane is effected, whereupon the system, when in the ascertained position, is connected to bite blocks or impression trays. Thereupon, while that portion which is connected with said bite blocks or impression trays retains its position in the chewing plane, the remaining rod system is tilted about a horizontal axis perpendicular to the sagittal plane and is oriented according to the skull base plane. The orientation with regard to the chewing plane as well as with regard to the skull plane may be effected by sighting the rod system perpendicularly to the sagittal plane over a preferably transparent ruler arranged parallel to the chewing or skull base plane. It will be appreciated that this orientation is effected by sighting on the patient. Thereupon, the rod system is so tilted that a rod located in the sagittal plane will be parallel to the ruler. After, in this way, the individual rods of the rod system have been oriented according to the chewing plane, the skull base plane, and the sagittal plane, and after the rods have been arrested in their respective positions, the thus adjusted system together with the bite blocks or the impression trays are so placed on a plate that those rods of the rod system which represent the skull base plane will be parallel to said plate. By sighting, it is rather easy for the dentist to place the rods of the system on the patient into the proper position with regard to the chewing plane, the skull base plane and the sagittal plane and it will thus be assured that when inserting the bite blocks or impressions for the dental plates into the articulator, the bite blocks and the impressions therein will be in the proper position with regard to the articulator.

*Structural arrangement*

Referring now to the drawings in detail and Figs. 1 to 3 in particular, the device illustrated therein consists primarily of a cross piece or connecting piece 1 having three bores which are perpendicular to each other. The first bore shown in Fig. 1 as being perpendicular to the plane of the drawing receives a stud portion or shaft 2 of a connecting member or piece 3 which is adapted to be connected with the bite blocks to be placed into the mouth of the patient or with the impression trays. A second bore which is perpendicular to the first mentioned bore receives a rod 4 which is fixedly inserted into the cross piece 1 and may, for instance, be screwed thereinto. Preferably this rod 4 may at the same time also serve as adjusting screw for the shaft 2. In such an instance the rod 4 is provided with a knurled head or knob 5 or the like. A rod 6 is insertable into the third bore which is perpendicular to the above mentioned first and second bores. The rod 6 does not have to be fastened. In order to prevent the rod 6 from sliding out of the connecting piece 1, there may be slipped upon said rod 6 a resilient clamping piece, for instance in the form of two wire coils 7 which are interconnected by means of a wire tie 7'. Along the straight extension of the rod 4 within the cross piece 1 there may furthermore be fastened a short rod 8 by means of which the connecting piece 3 may be aligned with regard to the rod 4. A further rod 9 may be slidably connected in a position perpendicular to the rod 6. In order to be able, after adjusting the device with regard to the chewing and skull base plane, to ascertain the angle formed by the connecting piece 3 with regard to the rod system, it is preferable to provide an arched scale 10 on the shaft 2 of the connecting piece 3. The rods 4, 6 and 9 are shown reduced in length in Figs. 1, 2 and 3. The connecting piece 3 preferably consists of two rods which are connected to the shaft 2 on both sides of the cross piece 1. The said two rods are interconnected by means of a transverse piece 11. The cross piece is provided with three points 12 of which the medium one of which protrudes somewhat beyond the two outer rods.

Figure 4:
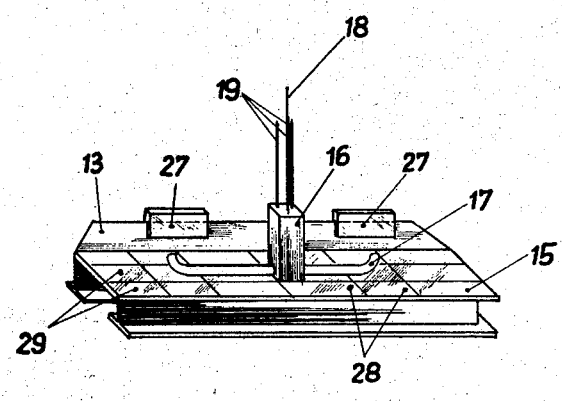
Fig. 4 is a perspective view of a stand for use in connection with the device shown in Figs. 1 to 3.

In order properly to insert the impressions into the articulator, a further device is required which is diagrammatically illustrated in Fig. 4. This device consists of a plate 15 on which a stand 16 is displaceable by means of a horseshoe-like yoke 17 or the like. Connected to the stand 16 are three rods. The system illustrated in Figs. 1 to 3 can after removal of the rod 6 be placed upon a somewhat longer rod 18. The rod 18 will then be located between the two other rods 19 so that the entire system cannot be turned any longer about the rod 18. The device for carrying out the method according to the present invention furthermore comprises a ruler illustrated in Fig. 5 which is preferably of transparent material and as will be evident from the drawing is provided with lines parallel to each other and parallel to the edges of the ruler.

Figure 6:
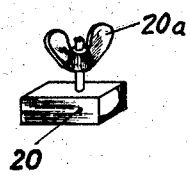
Fig. 6 is a perspective view of a hollow body adapted to be filled with wax for use in connection with the device according to the present invention.

In order to be able to connect also an impression tray to the system, a further auxiliary device shown in Fig. 6 in form of a hollow body 20 adapted to be filled with wax may be provided. By means of a wing nut 20a or the like, the hollow body 20 may be connected to the handle of the impression tray. The hollow space of the body 20 is filled with wax so that the points of the connecting piece can be pressed into the said wax filling.

Figure 5:
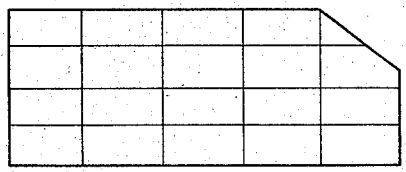
Fig. 5 represents a ruler for use in connection with the arrangement of the present invention.

The method according to the invention is carried out in the following manner: it may be assumed that a detachable tooth replacement is to be prepared for a toothless patient. For setting the device according to Figs. 1 to 3, the set screw is loosened by turning the knurled head 5 whereupon the connecting piece 3 is precisely aligned with rod 4. To this end the connecting piece 3 and rod 8 are grasped with the thumb and index finger so that the rod 8 is precisely between the rods of the part 3. Thereupon the shaft 2 is arrested again by turning the knurled head or knob 5. The device is then grasped by the right hand similar to a pencil and is warmed up somewhat over a flame. The tips 12 (Fig. 3) are then passed between the lips of the patient and pressed somewhat into the wax wall of a bite block in the patient's mouth. By sighting the patient from the front, the rod system is so adjusted that the rods 4 and 6 will lie precisely in the sagittal plane. This adjustment is facilitated by the transverse rod 9 which furthermore yields the possibility of controlling the position of the bi-pupilar line and of the two condyles. After the rod system by sighting from the front has been so adjusted that the rods 4 and 6 are located precisely in the sagittal plane, the rods 3 and 4 located in one plane are adjusted into the chewing plane by sighting from the side. To this effect, the transparent ruler shown in Fig. 5 is laterally placed on the ear with its surface parallel to the sagittal plane and with one of its longitudinal lines parallel to the chewing plane. As soon as the ruler is in the proper position, the rod system is tilted within the sagittal plane around the connecting point of the connecting piece 3 to the bite blocks to such an extent that the rods 3, 4 are precisely parallel to the longitudinal lines of the ruler. The proper position can be checked by the fact that now also the rod 6 must be parallel to the transverse lines of the ruler. In this position, the points 12 of the connecting piece 3 are strongly pressed into the wax wall so that the position of the connecting piece with regard to the bite blocks is fixed. By turning the knurled knob 5, the shaft 2 is unlocked so that the cross piece 1 with the rods 4 and 6 can now be turned about the shaft 2 toward the connecting piece 3. This rod system is now adjusted with regard to the skull base plane or Frankfort plane. Also this adjustment is effected by sighting perpendicular to the sagittal plane. The ruler is again applied, this time in such a position that its longitudinal edge or one longitudinal line is parallel to the skull base. After the rod system has been turned into this position, the rod 4 is again screwed in by turning the knob 5, thereby arresting the shaft 2. The result of this adjustment which is shown in Figs. 7 and 8 consists in that the connecting piece 3 will indicate the position of the chewing plane, while the rod 4 will indicate the position of the skull base plane, and the angle between the two will correspond to the angle between the chewing plane and the skull base plane. Due to the arched scale 10 which is connected to the shaft 2, this angle can be read preferably by means of the position of the rod 6 relative to the scale 10. At the same time, the position of the sagittal plane is ascertained due to the rods 4 and 6. The patient now opens his mouth so that the bite blocks connected to the device can be removed from his mouth. If the further working is effected at another place, it will suffice to mark down the degrees read on the arched scale 10. The connecting piece 3 may then carefully be pulled out of the wax wall.

Figure 9:
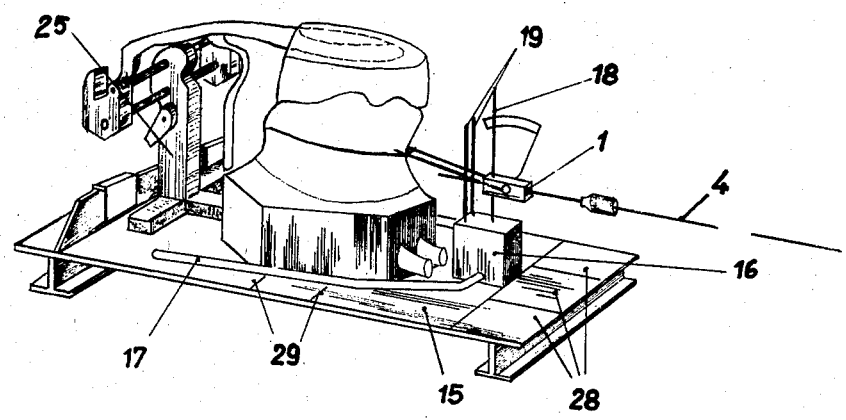
Fig. 9 is a diagrammatic illustration of an arrangement for properly orienting the rod means representing the saggital plane with regard to the articulator.

For purposes of further carrying out the method according to the invention, a similar rod system is inserted into the three bores of the wax wall and on the arched scale 10 the same degrees are set. The plaster jaw impressions are inserted in and fixed to the bite blocks which plaster jaw impressions are now geometrically oriented in an anatomically and spacially precise manner. The rod 6 is then removed from the cross piece and the cross piece is so placed upon the stand shown in Fig. 4 that the rod 18 is passed through the bore freed by removal of the rod 6 and the rod 8 will be located between the rods 19 as shown diagrammatically in Fig. 9. The base plate 15 is this model represents the skull base plane. The stand 16 with the rod system connected thereto and the bite blocks and jaw models can be displaced on this surface and beturned so that the sagittal plane represented by the rods 4 and 6 will assume the right position with regard to the articulator. In order to facilitate this adjustment, the articulator 25 is displaceable in transverse direction along a rail 13 connected to the plate 15 and can be arrested by means of abutments 27. Longitudinal and transverse lines 28, 29 provided on the plate 15 and arranged perpendicular to each other make it possible to establish the proper position of the rod system relative to the articulator which position precisely corresponds to the spacial position of the bite blocks in the mouth of the patient. In this position the jaw impressions are in a manner known per se, for instance by plaster, fastened in the articulator so that the further processing can be carried out according to heretofore known methods.

When a jaw with teeth is involved, the connecting piece 20 shown in Fig. 6 is by means of butterfly screw 21a clamped to the handle 21 of the impression tray 22 as shown in Fig. 10. The tips 12 of the connecting piece 3 can be pressed into the wax filling of the connecting piece 20 in the same manner as into the wax walls of the bite blocks. The same orientation according to the chewing plane and the skull base plane may be effected as above.

Fig. 10 diagrammatically illustrates the rod system with the impression tray after the impression tray has been withdrawn from the mouth of the patient. When further processing is to be effected, in this instance as, illustrated in Fig. 11, the entire system is reversed so that the print of the upper jaw which previously had been filled with plaster will now represent the lower part. The entire unit is then again placed upon the stand 16 and is connected by means of soft plaster previously applied to the plate 15. This plaster mass is molded in the customary manner to a socket model, the socket planes again being located precisely parallel to the skull base plane, while the chewing plane assumes the proper angular position to the skull base plane. The entire unit can now again by sighting by means of the rods 4 and 6 and the ruler arranged on the base plate 15 be oriented sagittally. Furthermore, corresponding markings can be provided on the socket so that due to these markings the model can at any time be properly oriented in the articulator.

In order to be able to control the angular position of the chewing plane also during the placing of the teeth into the articulator, the stand 16 with the set rod system may be placed next to the articulator in such a manner that the sagittal planes of the articulator and rod system are parallel to each other. Through the intervention of the connecting piece 3, the position of the chewing plane being formed may be sighted and controlled so that the location of the chewing plane on the plate will fully correspond to the anatomic conditions in the mouth of the patient and consequently will be able to follow the physiological chewing movements. The method according to the invention assures that the completed plate or dental work will be anatomically correct and thus closes a heretofore prevailing gap in the making of dental plates. The mostly necessary and frequent refitting of the dental plates which is bothersome for the patient and time-consuming for the dentist and patient alike and which nevertheless never fully overcomes a faulty spacial orientation of the dental plate parts, will become superfluous by the method according to the invention.

It is, of course, to be understood that the present invention is, by no means, limited to the particular method and the particular device described and shown in the drawings but also comprises any modifications within the scope of the appended claims.

What I claim is:

1. A device for orienting dental impressions in an anatomically spacially correct manner for preparing dental plates and similar dental work, which comprises in combination: a member having three bores arranged perpendicular to each other, a connecting member having a stud portion rotatably located in one of said bores, said connecting member being tiltable about the axis of said stud portion which axis is perpendicular to the sagittal plane of the patient to be fitted with said dental work, said connecting member being movable into a position parallel to the chewing plane of said patient, said connecting member also being adapted to be connected with impression-taking means, a first rod received in a second bore of said three bores, said rod being adjustable so as to be placed in said sagittal plane and to be brought into alignment with the longitudinal axis of said connecting member, and a second rod arranged in said third bore and adapted to be located in said sagittal plane and perpendicular to said first rod, said first and second rods being tiltable about the axis of said stud portion.

2. A device according to claim 1, which includes a third rod arranged perpendicular to said sagittal plane and displaceable on said second rod located in said sagittal plane and perpendicular to said chewing plane.

3. A device according to claim 1, which includes a plate visually representing the skull base plane of the patient to be fitted with said dental work, and a fourth rod arranged perpendicular to said plate and movable in any direction, said fourth rod being adapted to receive the adjusted rod system after removal of said second rod.

4. A device for orienting dental impressions in an anatomically spacially correct manner for preparing dental plates and similar dental work, which comprises in combination: a member having three bores arranged perpendicular to each other, a connecting member having a stud portion rotatably located in one of said bores, said connecting member being tiltable about the axis of said stud portion which axis is perpendicular to the sagittal plane of the patient to be fitted with said dental work, said connecting member being movable into a position parallel to the chewing plane of said patient, said connecting member also being adapted to be connected with impression-taking means, a first rod received in a second bore of said three bores and adapted to be placed in the sagittal plane of the patient to be fitted with said dental work and also adapted to be placed into an angular position with regard to said connecting member, and a second rod arranged in said third bore and adapted to be located in said sagittal plane and perpendicular to said first rod, said first and second rods being tiltable about the axis of said stud portion.

5. A device according to claim 4, which includes scale means connected to said tiltable connecting member and arranged to allow reading of the angle between the respective chewing plane and the respective skull base plane.

6. A device for orienting dental impressions in an anatomically spacially correct manner for preparing dental plates and similar dental work, which comprises in combination: a member having three bores arranged perpendicular to each other, a connecting member having a stud portion rotatably located in one of said bores, said connecting member being tiltable about the axis of said stud portion which axis is perpendicular to the sagittal plane of the patient to be fitted with said dental work, said connecting member being movable into a position parallel to the chewing plane of said patient, said connecting member also being adapted to be connected with impression-taking means, three point means arranged adjacent each other and connected to said connecting member and adapted to be pressed into the wax wall between bite blocks, a first rod received in a second bore of said three bores, said rod being adjustable so as to be placed in said sagittal plane and to be brought into alignment with said connecting member, and a second rod arranged in said third bore and adapted to be located in said sagittal plane and perpendicular to said first rod, said first and second rods being tiltable about the axis of said stud portion.

7. A device according to claim 6, in which said first rod is arranged to act as clamping screw for arresting said tiltable connecting member.

8. A device according to claim 6, which includes a bite block having a handle, and means threadedly connected to said handle, the points of said connecting member being adapted to be pressed into said wax.

9. A device for orienting dental impressions in an anatomically spacially correct manner for preparing dental plates and similar dental work, which comprises in combination: a member having three bores arranged perpendicular to each other, a connecting member having a stud portion rotatably located in one of said bores, said connecting member being tiltable about the axis of said stud portion which axis is perpendicular to the sagittal plane of the patient to be fitted with said dental work, said connecting member being movable into a position parallel to the chewing plane of said patient, said connecting member also being adapted to be connected with impression-taking means, three point means arranged adjacent each other and connected to said connecting member and adapted to be pressed into the wax wall between bite blocks, a first rod received in a second bore of said three bores and adapted to be placed in the sagittal plane of the patient to be fitted with said dental work and also adapted to be placed into an angular position with regard to said connecting member, and a second rod arranged in said third bore and adapted to be located in said sagittal plane and perpendicular to said first rod, said first and second rods being tiltable about the axis of said stud portion.

References Cited in the file of this patent

UNITED STATES PATENTS

| | | |
|---|---|---|
| 1,673,871 | Hawksworth | June 19, 1928 |
| 1,703,105 | Hawksworth | Feb. 26, 1929 |
| 2,225,274 | MacGoun | Dec. 17, 1940 |